(12) United States Patent
Li et al.

(10) Patent No.: US 11,898,626 B2
(45) Date of Patent: Feb. 13, 2024

(54) SYSTEM AND METHOD FOR BYPASSING A TORQUE CONVERTER IN A POWERTRAIN

(71) Applicant: GM GLOBAL TECHNOLOGY OPERATIONS LLC, Detroit, MI (US)

(72) Inventors: Dongxu Li, Troy, MI (US); Chengwu Duan, Shanghai (CN); Norman K. Bucknor, Troy, MI (US); Chunhao J. Lee, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 52 days.

(21) Appl. No.: 17/562,148

(22) Filed: Dec. 27, 2021

(65) Prior Publication Data

US 2023/0167889 A1    Jun. 1, 2023

(51) Int. Cl.
| | |
|---|---|
| F16H 45/02 | (2006.01) |
| F16H 61/14 | (2006.01) |
| F16H 41/22 | (2006.01) |
| F16H 45/00 | (2006.01) |
| F16H 41/24 | (2006.01) |

(52) U.S. Cl.
CPC ............ *F16H 45/02* (2013.01); *F16H 41/22* (2013.01); *F16H 61/143* (2013.01); *F16H 2041/246* (2013.01); *F16H 2045/002* (2013.01); *F16H 2045/0284* (2013.01)

(58) Field of Classification Search
CPC ............ F16H 61/143; F16H 45/02–2045/0294
See application file for complete search history.

(56) References Cited

U.S. PATENT DOCUMENTS

| | | | | |
|---|---|---|---|---|
| 5,065,645 | A | * | 11/1991 | Nagase ................ F16H 47/085 477/110 |
| 2007/0074943 | A1 | | 4/2007 | Hemphill et al. |
| 2008/0227597 | A1 | * | 9/2008 | Povirk ................... F16H 61/62 477/62 |
| 2008/0271966 | A1 | | 11/2008 | Simpson et al. |

(Continued)

FOREIGN PATENT DOCUMENTS

| | | | |
|---|---|---|---|
| DE | 10314338 A1 | 10/2004 | |
| DE | 102011109667 A1 | 2/2013 | |
| GB | 2193766 A * | 2/1988 | ............. F16H 45/00 |

*Primary Examiner* — David R Morris
*Assistant Examiner* — Aimee Tran Nguyen
(74) *Attorney, Agent, or Firm* — Quinn IP Law

(57) ABSTRACT

A system for bypassing a torque converter in a powertrain is provided. The system includes a torque generating device including an output shaft and a transmission assembly. The transmission assembly includes a transmission output shaft and a torque converter, a torque converter bypass shaft. The transmission assembly further includes a disconnect clutch selectively coupling the torque converter with the torque generating device and a torque converter clutch selectively coupling the torque converter bypass shaft with the torque generating device. Engaging the disconnect clutch and disengaging the torque converter clutch enables the torque generating device to transmit torque to the transmission output shaft through the torque converter. Engaging the torque converter clutch and disengaging the disconnect clutch enables the torque generating device to transmit torque to the transmission output shaft through the torque converter bypass shaft.

3 Claims, 4 Drawing Sheets

(56) References Cited

U.S. PATENT DOCUMENTS

| | | | |
|---|---|---|---|
| 2010/0105519 A1* | 4/2010 | Kasuya | F16H 45/02 477/5 |
| 2011/0114433 A1* | 5/2011 | Hattori | F16H 45/02 192/3.29 |
| 2016/0017933 A1* | 1/2016 | Nedorezov | F16D 33/18 701/68 |
| 2021/0025490 A1* | 1/2021 | Li | F16D 7/048 |

* cited by examiner

SYSTEM AND METHOD FOR BYPASSING A TORQUE CONVERTER IN A POWERTRAIN

CROSS REFERENCE TO RELATED APPLICATIONS

This disclosure claims priority to China Patent Application CN202111442377.9 filed on Nov. 30, 2021 which is hereby incorporated by reference.

INTRODUCTION

The disclosure generally relates to a system and method for bypassing a torque converter in a powertrain.

A powertrain may include a torque generating device and a transmission assembly transmitting torque from the torque generating device to a transmission output shaft.

Electrical motors are employed in vehicles as primary sources of motive power for the vehicle, e.g., in battery electric vehicles (BEVs), or as complements to other power sources such as internal combustion engines, e.g., in hybrid vehicles. Electric motor-generator units (MGUs) typically provide a relatively high torque output at low motor speeds in comparison to internal combustion engines of comparable power outputs, and as such MGUs are useful for providing "low-end" power for a vehicle. Nevertheless, MGUs are typically a relatively expensive and heavy component of a vehicle powertrain, especially where greater torque and/or power output is desired.

SUMMARY

A system for bypassing a torque converter in a powertrain is provided. The system includes a torque generating device including an output shaft and a transmission assembly. The transmission assembly includes a transmission output shaft, a torque converter, and a torque converter bypass shaft. The transmission assembly further includes a disconnect clutch selectively coupling the torque converter with the torque generating device and a torque converter clutch selectively coupling the torque converter bypass shaft with the torque generating device. Engaging the disconnect clutch and disengaging the torque converter clutch enables the torque generating device to transmit torque to the transmission output shaft through the torque converter. Engaging the torque converter clutch and disengaging the disconnect clutch enables the torque generating device to transmit torque to the transmission output shaft through the torque converter bypass shaft.

Such torque transmission through the torque converter bypass shaft may be desired for increased efficiency based upon driving conditions. Examples of driving conditions when the torque converter may be bypassed includes operation at relatively higher speeds and when the torque request commanded by the driver through the accelerator pedal is not high.

In some embodiments, the system further includes a clutch permitting torque transmission between the torque converter and the transmission output shaft in one direction.

In some embodiments, the torque generating device is a motor-generator unit.

In some embodiments, the system further includes a computerized transmission mode controller, operating programming to monitor vehicle operation conditions and an output shaft speed of the torque generating device. The controller also controls the disconnect clutch and the torque converter clutch based on vehicle operation conditions and the output shaft speed.

In some embodiments, the programming to control the disconnect clutch and the torque converter clutch includes, when operation of the torque converter is desirable, engaging the disconnect clutch to cause an impeller of the torque converter to spin with the output shaft of the torque generating device and disengaging the torque converter clutch to disconnect the torque converter bypass shaft from the output shaft of the torque generating device. The programming to control the disconnect clutch and the torque converter clutch further includes, when the operation of the torque converter is not desirable, disengaging the disconnect clutch to disconnect the impeller from the output shaft of the torque generating device and engaging the torque converter clutch to cause the torque converter bypass shaft to spin with the output shaft of the torque generating device.

In some embodiments, the system further includes a hydraulic pump providing pressurized fluid to the torque converter. When the operation of the torque converter is not desirable, the computerized transmission mode controller further operates programming to reduce a hydraulic pressure provided by the hydraulic pump.

In some embodiments, the torque converter includes a rotatable outer housing configured to rotate about a rotating axis of the torque converter, an impeller configured to rotate about the rotating axis, and a turbine configured to rotate about the rotating axis. The disconnect clutch is disposed within the torque converter and selectively connects the rotatable outer housing to the impeller. The torque converter bypass shaft is disposed within the torque converter and is configured to rotate about the rotating axis. The torque converter clutch selectively connects the rotatable outer housing to the torque converter bypass clutch.

In some embodiments, the transmission output shaft is disposed within the torque converter. The torque converter further includes a clutch permitting torque transmission between the turbine and the transmission output shaft in one direction.

In some embodiments, the transmission output shaft is disposed within the torque converter. The torque converter further includes a one-way clutch permitting torque transmission between the turbine and the transmission output shaft in one direction.

According to one alternative embodiment, a system for bypassing a torque converter in a powertrain in a vehicle is provided. The system includes a torque generating device including an output shaft and a transmission assembly. The transmission assembly includes a transmission output shaft and a torque converter. The torque converter includes a rotatable outer housing configured to rotate about a rotating axis of the torque converter, an impeller configured to rotate about the rotating axis, a turbine configured to rotate about the rotating axis, and a one-way clutch permitting torque transmission between the turbine and the transmission output shaft in one direction. The transmission assembly further includes a torque converter bypass shaft disposed within the torque converter and configured to rotate about the rotating axis, a disconnect clutch disposed within the torque converter and selectively coupling the torque converter with the torque generating device, and a torque converter clutch selectively coupling the torque converter bypass shaft with the torque generating device. Engaging the disconnect clutch and disengaging the torque converter clutch enables the torque generating device to transmit torque to the transmission output shaft through the torque converter.

Engaging the torque converter clutch and disengaging the disconnect clutch enables the torque generating device to transmit torque to the transmission output shaft through the torque converter bypass shaft.

In some embodiments, the system further includes a computerized transmission mode controller, operating programming to control the disconnect clutch and the torque converter clutch.

In some embodiments, the programming to control the disconnect clutch and the torque converter clutch includes, when operation of the torque converter is desirable, engaging the disconnect clutch to cause an impeller of the torque converter to spin with the output shaft of the torque generating device and disengaging the torque converter clutch. The programming to control the disconnect clutch and the torque converter clutch includes, when the operation of the torque converter is not desirable, disengaging the disconnect clutch to disconnect the impeller from the output shaft of the torque generating device and engaging the torque converter clutch.

In some embodiments, the torque generating device is a motor-generator unit.

According to one alternative embodiment, a method for bypassing a torque converter in a powertrain is provided. The method includes operating the powertrain including operating a torque generating device including an output shaft and operating a transmission assembly. The transmission assembly includes a transmission output shaft, a torque converter, and a torque converter bypass shaft. The transmission assembly further includes a disconnect clutch selectively coupling the torque converter with the torque generating device and a torque converter clutch selectively coupling the torque converter bypass shaft with the torque generating device. The method further includes, within a computerized processor, monitoring vehicle operation conditions and controlling the disconnect clutch and the torque converter clutch based upon the vehicle operation conditions. Controlling the disconnect clutch and the torque converter clutch includes, when operation of the torque converter is desirable, engaging the disconnect clutch to cause an impeller of the torque converter to spin with the output shaft of the torque generating device and disengaging the torque converter clutch to disconnect the torque converter bypass shaft from the output shaft of the torque generating device. Controlling the disconnect clutch and the torque converter clutch includes, when the operation of the torque converter is not desirable, disengaging the disconnect clutch to disconnect the impeller from the output shaft of the torque generating device and engaging the torque converter clutch cause the torque converter bypass shaft to spin with the output shaft of the torque generating device.

In some embodiments, operating the powertrain includes operating the powertrain within a vehicle.

In some embodiments, the powertrain further includes a clutch connecting the transmission output shaft and the torque converter in one direction.

In some embodiments, the powertrain further includes a one-way clutch connecting the transmission output shaft and the torque converter in one direction.

In some embodiments, the powertrain further includes a selectable one-way clutch connecting the transmission output shaft and the torque converter in one direction.

The above features and advantages and other features and advantages of the present disclosure are readily apparent from the following detailed description of the best modes for carrying out the disclosure when taken in connection with the accompanying drawings.

DETAILED DESCRIPTION

Figure 1:
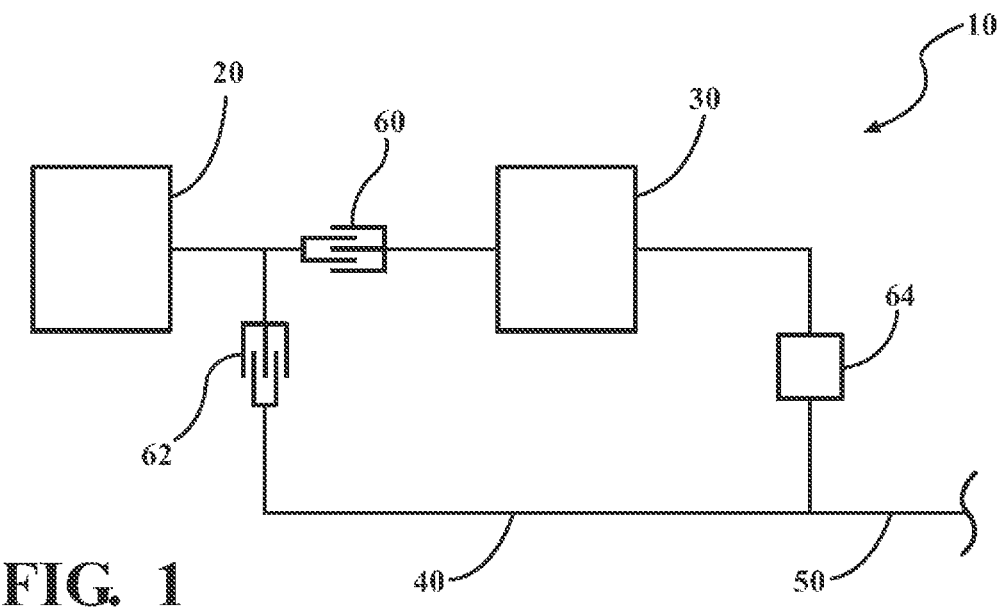
FIG. 1 schematically illustrates a powertrain system including a motor generator unit, a torque converter, a torque converter bypass shaft, and clutches useful to selectively transmit torque through the torque converter and the torque converter bypass shaft, in accordance with the present disclosure.

BEVs utilize stored energy to provide power to an MGU operative to provide motive force to the vehicle. An output shaft of the MGU provides a motor torque which may be utilized to provide motive force to the vehicle, for example, by transmitting torque to a transmission output shaft operably connected to wheels of the vehicle. A vehicle powertrain may include a torque converter. A torque converter may include a fluid coupling device useful to transmit torque between a torque converter input shaft and a torque converter output shaft. The fluid coupling of the torque converter may smooth or filter out vibrations and oscillating torques that are applied to either the torque converter input shaft or the torque converter output shaft.

The output shaft of the MGU or the MGU output shaft may be connected to or coupled with the torque converter input shaft. The torque converter output shaft may be connected to or coupled with a transmission output shaft. Torque may be transmitted from the MGU, through the torque converter, to the transmission output shaft. In one embodiment, a one-way clutch may be utilized to couple the torque converter output shaft to the transmission output shaft. The one-way clutch enables torque to be transmitted from the torque converter output shaft to the transmission output shaft, and the one-way clutch may freewheel when torque from the transmission output shaft is applied to the one-way clutch, such that the torque from the transmission output shaft is not transmitted to the torque converter output shaft. In one embodiment, the one-way clutch may be a selectable one-way clutch (SOWC).

A torque converter includes a fluid coupling device, including an impeller attached to the torque converter input shaft, a turbine attached to the torque converter output shaft, a pressurized liquid, and a stator located between the impeller and the turbine controlling fluid flow within the torque converter. As the input shaft turns, the impeller turns, which causes the fluid within the torque converter to spin. The spinning fluid acts upon the turbine, causing the turbine to turn. When the impeller is turning faster than the turbine, in particular at slower turbine speeds, speed of the fluid acting upon the relatively slow turbine causes an effect that may be described as torque multiplication. As a result of torque multiplication, torque generated upon the torque converter output shaft is greater than the torque applied to the torque converter input shaft.

A torque converter is useful for smoothing operation of or filtering vibrations from operation of a transmission. In particular, at slow rotational speeds and under conditions where torque multiplication is beneficial, the benefits of operation of the torque converter outweigh potential inefficiencies caused by the fluid coupling associated with operation of the torque converter. Operation of the torque converter may be useful during launch in a performance mode, towing an object at low speeds, and in uphill driving situations. However, at higher rotational speeds, benefits associated with operation of the torque converter reduce and inefficiencies associated with the fluid coupling increase, such that operation of the torque converter becomes undesirable at higher rotational speeds. Some torque converters include a locking mechanism useful to lock the impeller to the turbine at high rotational speeds, such that the fluid coupling of the torque converter ceases to operate and inefficiencies associated with the torque converter are reduced.

In another embodiment, a torque converter bypass shaft may be selectively utilized to transmit torque through a separate path, thereby bypassing the torque converter. Such a torque converter bypass shaft may be selectively coupled with the MGU output shaft by operation of a torque converter clutch (TCC). The torque converter input shaft remains coupled with the MGU output shaft, while the torque converter bypass shaft is attached to the MGU output shaft when the TCC is in a locked condition. When the TCC is in an unlocked condition, torque may no longer be transmitted through the torque converter bypass shaft, and torque is transmitted through the torque converter.

The torque converter was initially developed for use with internal combustion engines. An active torque converter including a spinning impeller includes fluid spinning within the torque converter. Spinning fluid within the torque converter creates centrifugal forces within the torque converter. A torque converter includes a maximum rotational speed based upon factors including the centrifugal forces created by the spinning fluid within the torque converter. Internal combustion engines and torque converters may include similar maximum rotational speeds. An MGU may be capable of relatively higher rotational speeds than a torque converter. As a result, a rotational speed of an MGU connected simultaneously to a torque converter and to a torque converter bypass shaft may be limited by the maximum rotational speed of the torque converter.

A system for bypassing a torque converter in a powertrain is provided. The system includes a torque generating device and a transmission assembly transmitting torque from the torque generating device to a transmission output shaft. The transmission assembly includes a torque converter, a torque converter bypass shaft, a TCC operable to selectively couple the torque converter bypass shaft to the torque generating device, and a disconnect clutch operable to selectively couple the torque converter to the torque generating device. The torque generating device may include an MGU. Locking or engaging the disconnect clutch and disengaging the TCC enables the torque generating device to transmit torque to the transmission output shaft through the torque converter at relatively low rotational speeds. Locking or engaging the TCC and disengaging the disconnect clutch enables the torque generating device to transmit torque to the transmission output shaft through the torque converter bypass shaft at relatively higher speeds.

Bypassing the torque converter at relatively high rotational speeds and disconnecting the torque converter from the MGU output shaft includes benefits to operation of the system. By not rotating the torque converter impeller with the MGU output shaft, the centrifugal forces within the torque converter that would result from operation at high rotational speeds is avoided. Therefore, the rotational speed of the MGU is no longer limited by the maximum rotational speed of the torque converter. Additionally, rotating the torque converter with the MGU output shaft increases the rotational inertia that the MGU overcomes to change rotational speed. This increased rotational inertia expends more battery energy to manage. By disconnecting the torque converter from the MGU output shaft, the rotational inertia of the MGU output shaft and attached components is decreased. Additionally, when the torque converter is activated, the fluid within the torque converter is pressurized by a pump. When the torque converter is inoperative and disconnected from the MGU output shaft, the hydraulic pressure within the torque converter may be permitted to decrease and load upon a hydraulic pump pressurizing the fluid may be reduced or eliminated. This decreased load upon the hydraulic pump saves energy.

Referring now to the drawings, wherein like reference numbers refer to like features throughout the several views, FIG. 1 schematically illustrates a powertrain system 10 including a motor generator unit (MGU) 20, a torque converter 30, a torque converter bypass shaft 40, and clutches 60, 62, and 64 useful to selectively transmit torque through the torque converter and the torque converter bypass shaft. The torque converter 30, the torque converter bypass shaft, and the clutches 60, 62, and 64 may be described together as a transmission assembly. The powertrain system 10 is operable to generate torque and transmit the torque to an output shaft 50. Transmission output shaft 50 may be operatively connected to various devices or mechanisms that may operate through torque provided by a spinning shaft. In one embodiment, the transmission output shaft 50 may be connected to wheels of a vehicle in order to provide motive force to the vehicle. In another embodiment, the transmission output shaft 50 may be connected to a pump or a generator.

The motor generator unit 20 may be described as an electric machine or an electric motor which is operable to utilize electric energy to generate a motor generator output torque and is similarly operable to generate electrical energy from a torque transmitted to the motor generator unit 20.

The torque converter 30 includes internal components operable to provide a fluid coupling between a torque converter input shaft and a torque converter output shaft. The torque converter 30 may include an impeller, a stator, and a turbine. Each of the impeller, the stator, and the turbine may include features such as vanes created to affect desired interaction with fluid contained within the torque converter 30. The torque converter 30 may include a mechanism operable to selectively lock the torque converter 30, such that the impeller and turbine are forced to spin in unison. Hydraulic fluid within the torque converter 30 is pressurized, and pressure may be supplied by operation of a hydraulic pump.

The torque converter 30 is connected to output shaft 50 through the clutch 64. The clutch 64 may be one of various types of clutches. In one embodiment, the clutch 64 may be a one-way clutch (otherwise described as a mechanical diode) which permits the torque converter 30 to transmit torque to the output shaft 50 while preventing torque from being transmitted from the output shaft 50 to the torque converter 30. When a one-way clutch is operable to prevent torque from being transmitted through the clutch, the clutch may be described as freewheeling. In one embodiment, the clutch 64 may be a selectable one-way clutch (SOWC), where the clutch 64 may be controllable, enabling selective transmission and/or prevention of transmission of torque through the SOWC in either direction.

The clutch 60 may be described as a disconnect clutch or a disconnect clutch. The clutch 60 may be a friction clutch (multiplate or single face) or a dog clutch with synchro (a clutch with elements that have gear teeth or similar features operable to selectively engage each other with a synchronizer device useful to match speeds of the clutch elements prior to engagement.)

The clutch 62 may be described as a torque converter clutch (TCC) or as a torque converter bypass clutch. The clutch 62 may be a friction clutch (multiplate or single face), a dog clutch with synchro, or an SOWC.

The torque converter 30 provides benefits to operation of the powertrain system 10, in particular, at relatively lower rotational speeds. At such low speeds, the clutch 62 may be disengaged, thereby disconnecting the torque converter bypass shaft 40 from the MGU 20. However, as described herein, benefits may be achieved at relatively high rotational speeds by selectively disconnecting the torque converter 30 from the MGU 20, and instead connecting the torque converter bypass shaft to the MGU 20. In one embodiment, where torque is being transmitted through the torque converter bypass shaft 40 and the clutch 60 is disengaged, the clutch 64 may be configured to freewheel in both rotational directions and isolate the torque converter 30 from torque and rotation. Isolating the torque converter 30 while torque is being transmitted through the torque converter bypass shaft frees the MGU 20 from a maximum rotational speed limitation imposed by the torque converter 30. Additionally, isolating the torque converter 30 while torque is being transmitted through the torque converter bypass shaft reduces rotational inertia of the system thereby making the MGU 20 operate more efficiently. Additionally, isolating the torque converter 30 while torque is being transmitted through the torque converter bypass shaft enables a reduction of pressure of the fluid within the torque converter 30, saving the energy required to pressurize the fluid.

The powertrain system 10 may operate in one of several transmission modes. In a torque converter mode, the clutch 60 is engaged, thereby connecting the torque converter 30 to the MGU 20. In the torque converter mode, the clutch 62 is disengaged, thereby disconnecting the torque converter bypass shaft 40 from the MGU 20. In the torque converter mode, the clutch 64 is operable to enable torque transmission from the torque converter 30 to the output shaft 50. The clutch 64 may optionally be operable to enable torque transmission from the output shaft 50 to the torque converter 30.

In a torque converter bypass mode, the clutch 60 is disengaged, thereby disconnecting the torque converter 30 from the MGU 20. In the torque converter bypass mode, the clutch 62 is engaged, thereby connecting the torque converter bypass shaft 40 to the MGU 20. In the torque converter mode, the clutch 64 is operable to freewheel, isolating the torque converter 30 from the output shaft 50.

In a transition mode which may be described as a disengaging torque converter transition mode, an engaging clutch and a disengaging clutch may be identified. In one transition, where the torque converter 30 is to change from an operational state to a deactivated or isolated state, the engaging clutch may be the clutch 62 and the disengaging clutch may be the clutch 60. The clutch 62 may be transitioned over time period from a disengaged state to an engaged state, for example, with pressure applied between clutch friction plates being ramped up through the time period. Once the clutch 62 is fully engaged, then the clutch 60 may disengage over a second time period. During this transition, the clutch 64 may transition from being operable to transmit torque in at least one direction to freewheeling.

In another transition which may be described as an engaging torque converter transition mode, where the torque converter 30 is to change from a deactivated state to an operational state, the engaging clutch may be the clutch 60 and the disengaging clutch may be the clutch 62. The clutch 60 may be engaged to synchronize a speed of the torque converter input shaft with a speed of the MGU output shaft. Torque commanded of the MGU 20 may be increased to overcome inertia of the torque converter 30 during the engagement. During this transition, the clutch 64 may transition from freewheeling to being operable to transmit torque in at least one direction. Operation of the clutch 64 as a one-way clutch or an SOWC enables automatic engagement at when the torque converter output shaft reaches synchronization with the output shaft 50 for smooth engagement with minimal drive quality effect.

Figure 2:
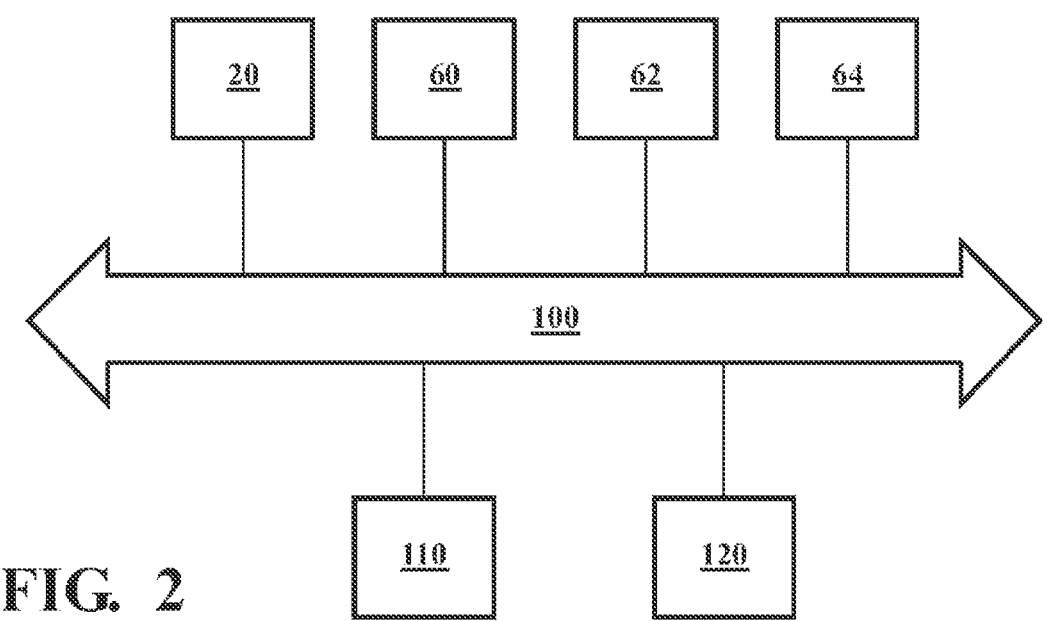
FIG. 2 schematically illustrates components of the powertrain system of FIG. 1 and a computerized transmission mode controller electronically communicating through a communications bus device, in accordance with the present disclosure.

FIG. 2 illustrates components of the powertrain system of FIG. 1 and a computerized transmission mode controller 110 electronically communicating through a communications bus device 100. The MGU 20, the clutch 60, the clutch 62, and the clutch 64 are illustrated electronically connected to the communications bus device 100. Additionally, the computerized transmission mode controller 110 and an electronically controlled pump 120 are illustrated electronically connected to the communications bus device 100. The pump 120 provides pressurized fluid to the torque converter 30 of FIG. 1. In some embodiments, the pump 120 may alternatively be a mechanically controlled pump which would not be connected to the communications bus device 100. The communications bus device 100 is configured to enable data and command communication between the various connected devices.

Figure 3:
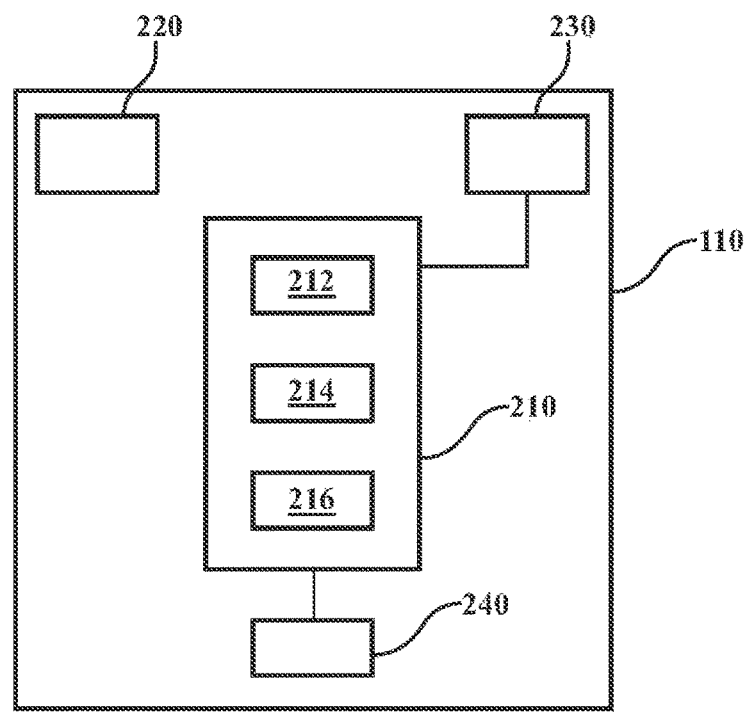
FIG. 3 schematically illustrates the computerized transmission mode controller of FIG. 2, in accordance with the present disclosure.

FIG. 3 illustrates the computerized transmission mode controller of FIG. 2. The computerized transmission mode controller 110 includes a computerized processing device 210, a cellular communications module 220, a user input/output device 230, and a memory storage device 240. It is noted that the computerized transmission mode controller 110 may include other components and some of the components are not present in some embodiments.

The processing device 210 may include memory, e.g., read only memory (ROM) and random-access memory (RAM), storing processor-executable instructions and one or more processors that execute the processor-executable instructions. In embodiments where the processing device 210 includes two or more processors, the processors may operate in a parallel or distributed manner. The processing device 210 may execute the operating system of the computerized transmission mode controller 110. Processing device 210 may include one or more modules executing programmed code or computerized processes or methods including executable steps. Illustrated modules may include a single physical device or functionality spanning multiple physical devices. In the illustrative embodiment, the processing device 210 also includes a powertrain status module 212, a clutch control module 214, and a motor and hydraulic pressure control module 216, which are described in greater detail below.

The cellular communications module 220 may include a communications/data connection with a bus device configured to transfer data to different components of the system and may include one or more wireless transceivers for performing wireless communication.

The user input/output device 230 includes hardware and/or software configured to enable the processing device 210 to provide information to and receive inputs from a user, for example, a driver of a vehicle.

The memory storage device 240 is a device that stores data generated or received by the computerized transmission mode controller 110. The memory storage device 240 may include, but is not limited to, a hard disc drive, an optical disc drive, and/or a flash memory drive.

The powertrain status module 212 may include programming operable to monitor, estimate, and/or predict operation various components of the powertrain system. In particular, the powertrain status module 212 operates programming to determine a current and/or predicted speed range of the MGU 20 of FIG. 1, such that a determination may be made whether the system should utilize a torque converter mode, i.e., when operation of the torque converter is desirable, or a torque converter bypass mode, i.e., when operation of the torque converter is not desirable, as disclosed herein. In one embodiment, the powertrain status module 212 may additionally include data collected based upon user inputs, such as an accelerator pedal position of the driver and/or navigation data useful to predict upcoming behavior of a vehicle using the powertrain system.

The clutch control module 214 may include programming operable to control operating clutches used by the disclosed powertrain system. The clutch control module 214 may include programming useful to maintain a clutch in an engaged state, maintain a clutch in a disengaged state, and transition a clutch between states. The clutch control module 214 may further include programming to control operation of an SOWC, controlling whether the SOWC permits or prevents torque transmission through the SOWC.

The motor and hydraulic pressure control module 216 may include programming operable to control operation of the MGU 20 of FIG. 1, for example, enabling control of the motor speed to enable synchronization of the MGU output shaft speed with the torque converter input shaft speed. Additionally, the motor and hydraulic pressure control module 216 may include programming operable to control activation and deactivation of a hydraulic pump supplying pressurized fluid to the torque converter 30 of FIG. 1 or programming operable to decrease pressure of the fluid provided to the torque converter 30.

The computerized transmission mode controller 110 is provided as an exemplary computerized device capable of executing programmed code to operate the disclosed process. A number of different embodiments of the computerized transmission mode controller 110 and modules operable therein are envisioned, and the disclosure is not intended to be limited to examples provided herein.

Figure 4:
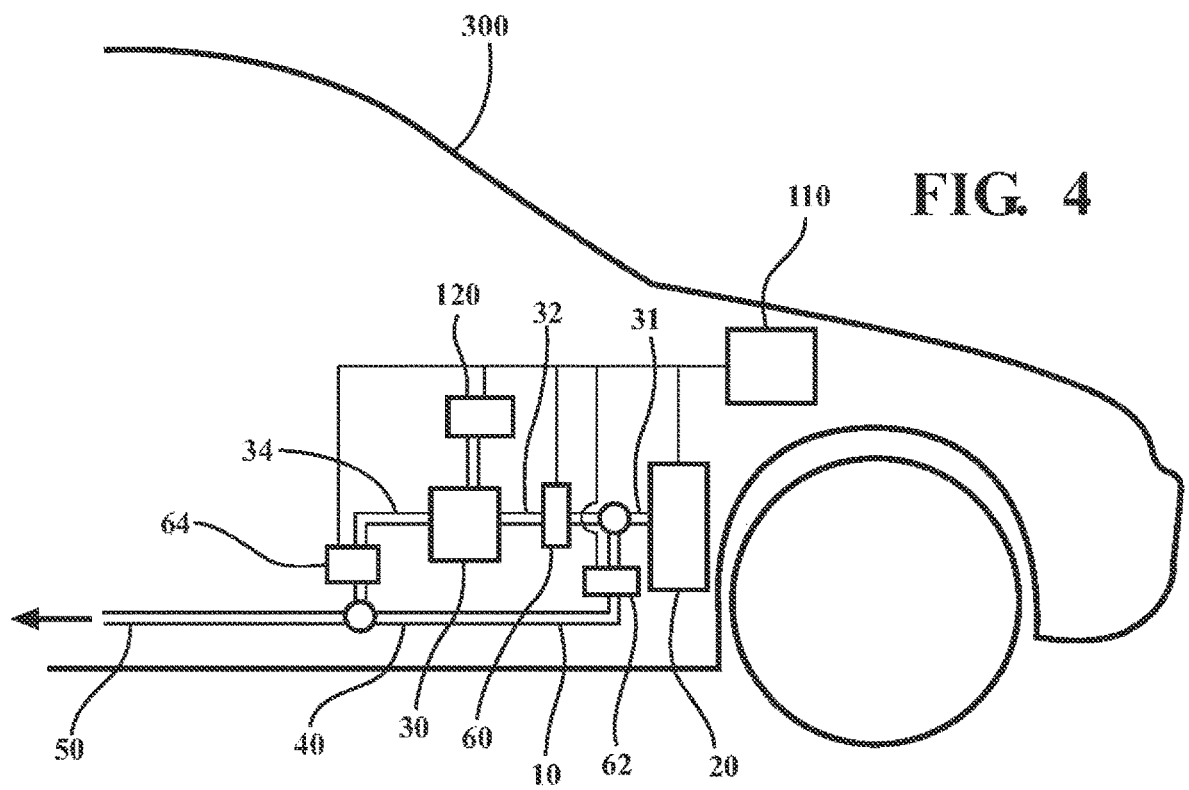
FIG. 4 schematically illustrates the powertrain system of FIG. 1 operating within a battery electric vehicle, in accordance with the present disclosure.

FIG. 4 schematically illustrates the powertrain system 10 of FIG. 1 operating within a battery electric vehicle 300. The powertrain system 10 is installed within the battery electric vehicle 300 and supplies an output torque to the output shaft 50. The output shaft 50 is illustrated providing mechanical power to rear wheels of the battery electric vehicle 300. The output shaft 50 may supply mechanical power to front wheels of the battery electric vehicle 300, rear wheels of the battery electric vehicle 300, or front and rear wheels of the battery electric vehicle 300. The MGU 20 is illustrated including an MGU output shaft 31. The torque converter 30 is illustrated including a torque converter input shaft 32 and a torque converter output shaft 34. The torque converter bypass shaft 40 is illustrated. The various shafts are illustrated by simple lines, right angles, and circles indicating intersections of shafts. It will be appreciated that the illustrations are provided for simplicity to describe alternative paths to transmit torque within the powertrain system 10. The powertrain system 10 may include transmission components such as cylindrical shafts, gears, planetary gear sets, multi-gear transmission assemblies, and other similar mechanical devices.

The computerized transmission mode controller 110 is illustrated in communication with the MGU 20, the clutch 60, the clutch 62, the clutch 64, and the hydraulic pump 120. The computerized transmission mode controller 110 monitors operation of the powertrain system 10 and provides control over the various components thereto. The computerized transmission mode controller 110 may additionally receive user or service input, for example, modifying speed ranges at which the torque converter is set to operate.

Figure 5:
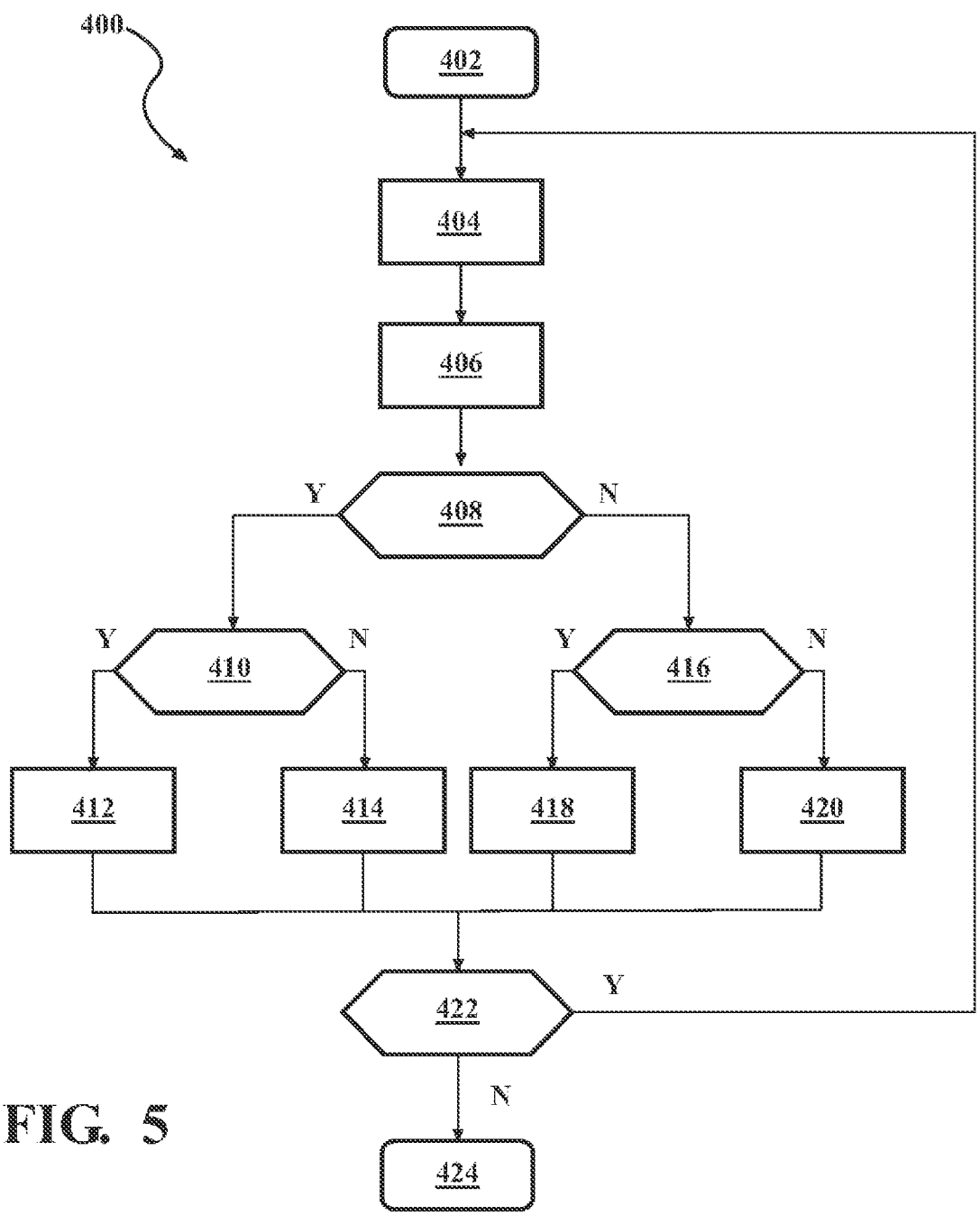
FIG. 5 is a flowchart illustrating a method to control a powertrain system including a plurality of clutches useful to selectively transmit torque through a torque converter and a torque converter bypass shaft, in accordance with the present disclosure.

FIG. 5 is a flowchart illustrating a method 400 to control a powertrain system including a plurality of clutches useful to selectively transmit torque through a torque converter and a torque converter bypass shaft. The method 400 starts at step 402. At step 404, an MGU output shaft speed is monitored. At step 406, the MGU output shaft speed is utilized to determine a desired transmission mode including one of a torque converter mode and a torque converter bypass mode. At step 408, if the desired transmission mode is torque converter mode, the method 400 advances to step 410. If the desired transmission mode is not the torque converter mode, the method 400 advances to step 416.

At step 410, a determination is made whether the powertrain system is already in the torque converter mode. If the powertrain system is in torque converter mode, the method 400 advances to step 412, where the disconnect clutch operable to selectively connect the torque converter input shaft to the MGU output shaft is maintained in an engaged state or condition and where the torque converter clutch operable to selectively connect the torque converter bypass shaft to the MGU output shaft is maintained in a disengaged state or condition.

If, at step 410, the powertrain system is not already in the torque converter mode, the method 400 advances to step 414, and a transition mode is commanded, where the disconnect clutch is transitioned to an engaged state and where the torque converter clutch is transitioned to a disengaged state.

At step 416, a determination is made whether the powertrain system is already in the torque converter bypass mode. If the powertrain system is in torque converter bypass mode, the method 400 advances to step 418, where the torque converter clutch is maintained in an engaged state or condition and where the disconnect clutch is maintained in a disengaged state or condition.

If, at step 416, the powertrain system is not already in the torque converter mode, the method 400 advances to step 420, and a transition mode is commanded where the torque converter clutch is transitioned to an engaged state and where the disconnect clutch is transitioned to a disengaged state.

At step 422, a determination is made whether the powertrain system is continuing to operate. If the system is continuing to operate, the method 400 returns to step 404 to repeat the method steps. If the system is not continuing to operate, the method 400 advances to step 424 where the method ends. The method 400 is provided as an exemplary method to control the disclosed powertrain system and select between a torque converter mode and a torque converter bypass mode. A number of alternative methods and method steps are envisioned, and the disclosure is not intended to be limited to the examples provided herein.

Figure 6:
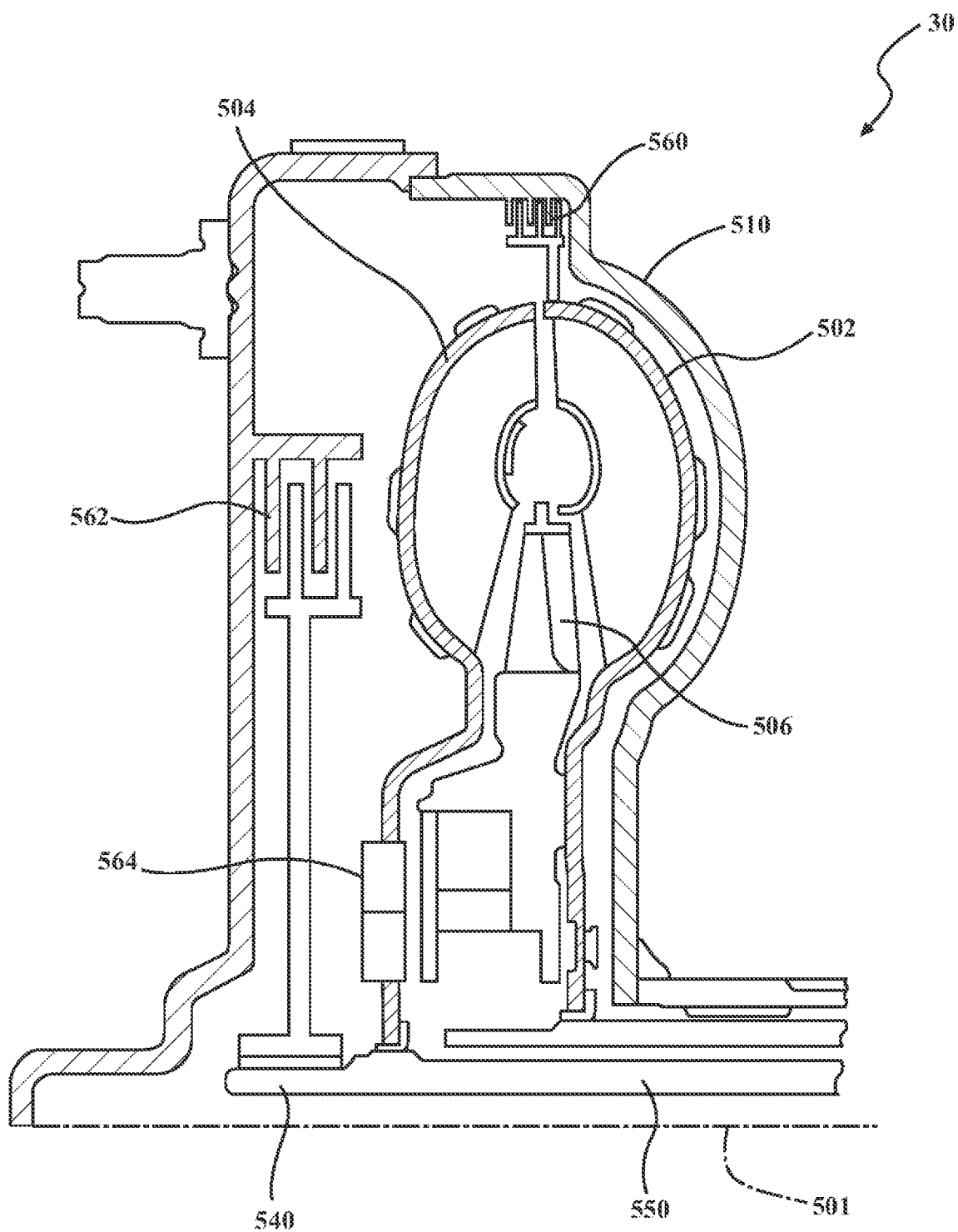
FIG. 6 schematically illustrates an exemplary torque converter including an integrated disconnect clutch, in accordance with the present disclosure.

A number of different torque converter configurations may be utilized with the disclosed system and method. FIG. 6 schematically illustrates in cross-sectional view the torque converter 30 including an integrated disconnect clutch 560. A top half of the torque converter 30 is illustrated including a torque converter rotational axis. A bottom half of the torque converter 30 may be substantially similar or identical to the illustrated top half. The torque converter 30 includes an impeller 502, a turbine 504, and a stator 506. The impeller 502 and the turbine 504 are configured to spin about the torque converter rotational axis 501. An MGU output shaft is connected to and provides a torque to a rotatable outer housing 510. The rotatable outer housing 510 is configured to spin about the torque converter rotational axis 501 and may spin in unison with the MGU output shaft. The rotatable outer housing 510 is connected to a disconnect clutch 560. The disconnect clutch 560 provides connection between the rotatable outer housing 510 and the impeller 502. Engagement of the disconnect clutch 560 causes the impeller 502 to spin in unison with the rotatable outer housing 510. The torque converter 30, when active, is filled with pressurized hydraulic fluid. The spinning of the impeller 502 acts upon the pressurized hydraulic fluid, which acts upon the turbine 504 and the stator 506, causing the turbine 504 to turn. The turbine 504 is connected to a one-way clutch 564 which permits or prevents torque being transmitted between the turbine 504 and a transmission output shaft 550 in one direction. The transmission output shaft 550 is illustrated as a hollow tube that spins about the torque converter rotational axis 501. When engaged, the disconnect clutch 560 enables use of the torque converter 30 in a torque converter mode as described herein.

A torque converter clutch 562 is illustrated, selectively connecting the rotatable outer housing 510 to a torque converter bypass shaft 540. In the embodiment of FIG. 6, the torque converter bypass shaft 540 is a portion of or is attached to the transmission output shaft 550 or the torque converter bypass shaft 540 and the transmission output shaft 550 are the same shaft. By engaging the torque converter clutch 562, the torque converter bypass shaft 540 and the attached transmission output shaft 550 are caused to spin with the rotatable outer housing 510.

Selective engagement and disengagement of the disconnect clutch 560 and the torque converter clutch 562 enables operation of a torque converter mode, wherein torque is transmitted through impeller 502 and the turbine 504 of the torque converter 30, and operation of the torque converter bypass mode, wherein the impeller 502 and the turbine 504 may be isolated from the rotatable outer housing 510 connected to the MGU output shaft and transmission of torque between the rotatable outer housing 510 and the output shaft 550 through the torque converter bypass shaft 540.

While the best modes for carrying out the disclosure have been described in detail, those familiar with the art to which this disclosure relates will recognize various alternative designs and embodiments for practicing the disclosure within the scope of the appended claims.

What is claimed is:

1. A system for bypassing a torque converter in a powertrain in a vehicle, comprising:
   a torque generating device including an output shaft;
   a transmission assembly including:
      a transmission output shaft;
      a torque converter, including
         a rotatable outer housing configured to rotate about a rotating axis of the torque converter;
         an impeller configured to rotate about the rotating axis;
         a turbine configured to rotate about the rotating axis; and
         a one-way clutch permitting torque transmission between the turbine and the transmission output shaft in one direction;
      a torque converter bypass shaft disposed within the torque converter and configured to rotate about the rotating axis;
      a disconnect clutch disposed within the torque converter and selectively coupling the torque converter with the torque generating device;
      a torque converter clutch selectively coupling the torque converter bypass shaft with the torque generating device; and
   a computerized transmission mode controller, operating programming to control the disconnect clutch and the torque converter clutch;
   wherein engaging the disconnect clutch and disengaging the torque converter clutch enables the torque generating device to transmit torque to the transmission output shaft through the torque converter;
   wherein engaging the torque converter clutch and disengaging the disconnect clutch enables the torque generating device to transmit torque to the transmission output shaft through the torque converter bypass shaft;
   wherein the torque generating device is a motor-generator unit that utilizes electric energy to generate a motor-generator output torque and generates electrical energy from a torque transmitted to the output shaft of the motor-generator unit;
   wherein the programming to control the disconnect clutch and the torque converter clutch includes:
      when operation of the torque converter is desirable, engaging the disconnect clutch to cause an impeller of the torque converter to spin with the output shaft of the torque generating device and disengaging the torque converter clutch; and
      when the operation of the torque converter is not desirable, disengaging the disconnect clutch to disconnect the impeller from the output shaft of the torque generating device and engaging the torque converter clutch; and
   wherein operation of the torque converter is not desirable when the speed of the motor-generator, when acting as a motor, exceeds a maximum rotational speed limitation imposed by the torque converter.

2. A method for bypassing a torque converter in a powertrain, comprising:
   operating the powertrain including:
      operating a torque generating device including an output shaft; and
      operating a transmission assembly including:
         a transmission output shaft;
         a torque converter;
         a torque converter bypass shaft;

a disconnect clutch selectively coupling the torque converter with the torque generating device;

a torque converter clutch selectively coupling the torque converter bypass shaft with the torque generating device; and a selectable one-way clutch connecting the transmission output shaft and the torque converter in one direction; and within a computerized processor, monitoring vehicle operation conditions; and controlling the disconnect clutch and the torque converter clutch based upon the vehicle operation conditions, wherein the controlling includes:

when operation of the torque converter is desirable, engaging the disconnect clutch to cause an impeller of the torque converter to spin with the output shaft of the torque generating device and disengaging the torque converter clutch to disconnect the torque converter bypass shaft from the output shaft of the torque generating device; and when the operation of the torque converter is not desirable, disengaging the disconnect clutch to disconnect the impeller from the output shaft of the torque generating device and engaging the torque converter clutch cause the torque converter bypass shaft to spin with the output shaft of the torque generating device;

wherein the torque generating device is a motor-generator unit that utilizes electrical energy to generate a motor-generator output torque and generates electrical energy from a torque transmitted to the output shaft of the motor-generator unit; and wherein operation of the torque converter is not desirable when the speed of the motor-generator, when acting as a motor, exceeds a maximum rotational speed limitation imposed by the torque converter.

3. The method of claim 2, wherein operating the powertrain includes operating the powertrain within a vehicle.

* * * * *